United States Patent
Bharghavan et al.

(10) Patent No.: US 8,893,252 B1
(45) Date of Patent: Nov. 18, 2014

(54) WIRELESS COMMUNICATION SELECTIVE BARRIER

(75) Inventors: Vaduvur Bharghavan, Morgan Hill, CA (US); Vijaykarthik Rajanarayanan, Sunnyvale, CA (US)

(73) Assignee: Meru Networks, Sunnyvale, CA (US)

( * ) Notice: Subject to any disclaimer, the term of this patent is extended or adjusted under 35 U.S.C. 154(b) by 1080 days.

(21) Appl. No.: 12/425,098

(22) Filed: Apr. 16, 2009

Related U.S. Application Data

(60) Provisional application No. 61/045,522, filed on Apr. 16, 2008.

(51) Int. Cl.
*H04K 3/00* (2006.01)
*H04L 12/22* (2006.01)

(52) U.S. Cl.
USPC ............... 726/11; 726/13; 380/258; 713/154

(58) Field of Classification Search
USPC .................. 726/11, 13; 713/154; 380/258
See application file for complete search history.

(56) References Cited

U.S. PATENT DOCUMENTS

| | | | |
|---|---|---|---|
| 5,038,151 A | 8/1991 | Kaminski | |
| 5,966,094 A | 10/1999 | Ward et al. | |
| 6,122,681 A * | 9/2000 | Aditya et al. | 710/52 |
| 6,760,318 B1 | 7/2004 | Bims | |
| 6,788,658 B1 | 9/2004 | Bims | |
| 6,839,038 B2 | 1/2005 | Weinstein | |
| 6,894,649 B2 | 5/2005 | Ostervall | |
| 6,933,909 B2 | 8/2005 | Theobold | |
| 6,954,177 B2 | 10/2005 | Channabassappa et al. | |
| 6,978,158 B2 | 12/2005 | Ghavami | |
| 7,013,482 B1 * | 3/2006 | Krumel | 726/13 |
| 7,082,198 B1 * | 7/2006 | Ishii | 380/239 |
| 7,154,874 B2 * | 12/2006 | Bhagwat et al. | 370/338 |
| 7,251,457 B1 * | 7/2007 | Davi | 455/67.13 |
| 7,319,685 B2 | 1/2008 | Kim et al. | |
| 7,333,455 B1 | 2/2008 | Bolt et al. | |
| 7,333,481 B1 * | 2/2008 | Rawat et al. | 370/352 |
| 7,359,362 B2 | 4/2008 | King et al. | |
| 7,484,008 B1 * | 1/2009 | Gelvin et al. | 709/249 |
| 7,864,673 B2 * | 1/2011 | Bonner | 370/230 |
| 2003/0149891 A1 * | 8/2003 | Thomsen | 713/201 |
| 2004/0034793 A1 * | 2/2004 | Yuan | 713/200 |
| 2004/0203910 A1 * | 10/2004 | Hind et al. | 455/456.1 |
| 2005/0020244 A1 * | 1/2005 | Chang et al. | 455/410 |
| 2005/0152314 A1 | 7/2005 | Sun et al. | |
| 2005/0195753 A1 * | 9/2005 | Chaskar et al. | 370/254 |
| 2005/0259611 A1 * | 11/2005 | Bhagwat et al. | 370/328 |

(Continued)

OTHER PUBLICATIONS

Egli, Peter. "Susceptibility of wireless devices to denial of service attacks", 2006.*

(Continued)

*Primary Examiner* — Michael Simitoski
(74) *Attorney, Agent, or Firm* — Law Office of Dorian Cartwright

(57) ABSTRACT

A selective barrier prevents undesired communication between a protected region and an unprotected region. Wireless communication is allowed within the protected region, while wireless communication is prevented between the protected region and any unprotected regions. Particular undesired message packets might be selected by business rules responsive to aspects of individual messages. Particular unprotected regions might be statically or dynamically determined. Alternatively, the selective barrier similarly operates to block undesired message packets from originating in any of the unprotected regions and successfully being received in the protected region.

14 Claims, 2 Drawing Sheets

(56) References Cited

U.S. PATENT DOCUMENTS

| | | | |
|---|---|---|---|
| 2006/0070113 A1* | 3/2006 | Bhagwat et al. | 726/2 |
| 2007/0025313 A1* | 2/2007 | Bhagwat et al. | 370/338 |
| 2007/0094741 A1* | 4/2007 | Lynn et al. | 726/26 |
| 2008/0046972 A1* | 2/2008 | Tiwari | 726/3 |
| 2008/0052767 A1* | 2/2008 | Tiwari | 726/3 |
| 2008/0052779 A1* | 2/2008 | Sinha et al. | 726/22 |

OTHER PUBLICATIONS

Habib et al. "Multi-antenna techniques for OFDM based WLAN." Proceedings of First International Conference on Next-Generation Wireless Systems, Jan. 2006, pp. 186-190.

Kitahara et al. "A base station adaptive antenna for downlink transmission in a DS-CDMA system." IEEE 51st Vehicular Technology Conference Proceedings, 2000 (Abstract).

Mahler et al. Design and optimisation of an antenna array for WiMAX base stations. IEEE/ACES International Conference on Wireless Communications and Applied Computational Electromagnetics, 2005 (Abstract).

Miaris et al. "On the base stations antenna system design for mobile communications." Electrical Engineering, 2006, pp. 157-163, vol. 88.

Miura et al. "Study of array pattern tuning method using hybrid genetic algorithms for figure-8 satellite's earth station antenna." Asia-Pacific Microwave Conference Proceedings, 2000 (Abstract).

Ponnapalli et al. "Design and packaging of antennas for wireless systems." Proceedings of Electrical Performance of Electrical Packaging, 1995 (Abstract).

Sarolic. "Base station antenna near-field radiation pattern distortion analysis." Sixth International Conference on Computational Methods for the Solution of Electrical and Electromagnetic Engineering Problems Incorporating Electromagnetic Effects on Human Beings and Equipment Seminar, 2003 (Abstract).

* cited by examiner

WIRELESS COMMUNICATION SELECTIVE BARRIER

CROSS REFERENCE TO RELATED APPLICATION

This application claims priority from U.S. Provisional Application No. 61/045,522 filed Apr. 16, 2008 titled "Wireless Communication Selective Barrier" in the name of the same inventor.

BACKGROUND

Messages from wireless communication systems can sometimes be received by devices other than to which those messages were directed. If those messages are not protected by encryption or some other technique, it might occur that an unwanted recipient might receive information not intended for that recipient. For one example, some retail POS (point of sale) systems are electronically coupled using wireless communication, which presents the risk of a breach of security by an unwanted recipient who receives those messages.

SUMMARY OF THE DESCRIPTION

A set of techniques include methods, devices, and systems, providing a selective barrier applicable to wireless communication systems. The selective barrier operates to prevent undesired communications between or among selected devices. The techniques separate a protected region from one or more unprotected regions, with the effect that undesired wireless communication is allowed within the protected region, while wireless communication is prevented between the protected region and any of the unprotected regions In a first embodiment, a selective barrier between the protected region and the unprotected regions operates to block undesired message packets from originating in the protected region and successfully being received in the unprotected regions. The particular undesired message packets might be selected by business rules. The particular unprotected regions might be statically or dynamically determined. In a second embodiment, the selective barrier similarly operates to block undesired message packets from originating in any of the unprotected regions and successfully being received in the protected region.

DETAILED DESCRIPTION

Generality of Invention

This application should be read in the most general possible form. This includes, without limitation, the following:

References to specific techniques include alternative and more general techniques, especially when discussing aspects of the invention, or how the invention might be made or used.

References to "preferred" techniques generally mean that the inventor contemplates using those techniques, and thinks they are best for the intended application. This does not exclude other techniques for the invention, and does not mean that those techniques are necessarily essential or would be preferred in all circumstances.

References to contemplated causes and effects for some implementations do not preclude other causes or effects that might occur in other implementations.

References to reasons for using particular techniques do not preclude other reasons or techniques, even if completely contrary, where circumstances would indicate that the stated reasons or techniques are not as applicable.

Furthermore, the invention is in no way limited to the specifics of any particular embodiments and examples disclosed herein. Many other variations are possible which remain within the content, scope and spirit of the invention, and these variations would become clear to those skilled in the art after perusal of this application.

FIGURES AND TEXT

Figure 1:
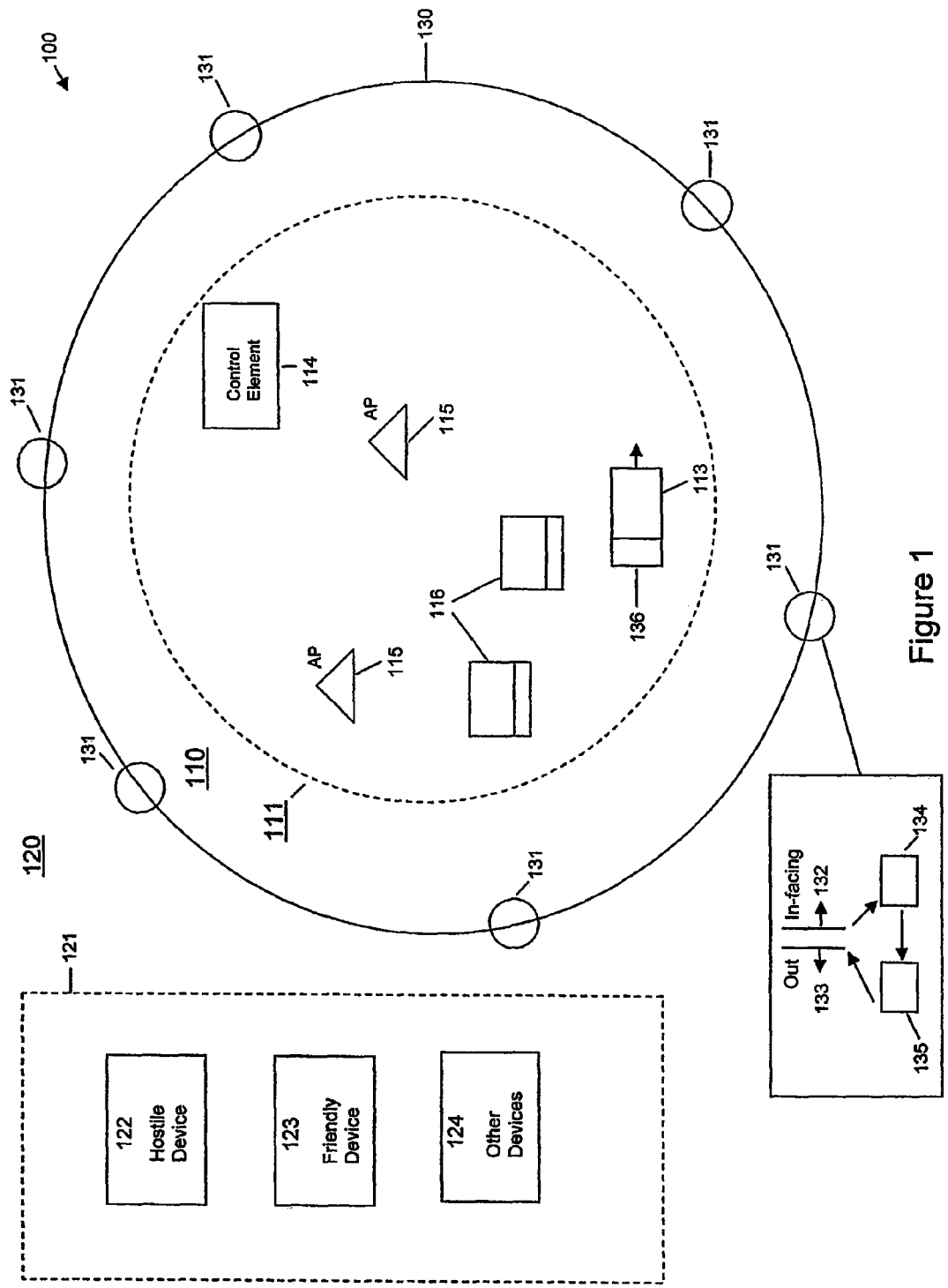
FIG. 1 is a block diagram illustrating a system for providing a selective barrier for wireless communication.

FIG. 1 shows a system block diagram.

A system 100 includes objects and connections as shown in the FIG. 1, including at least a protected region 110, a non-protected region 120, and a boundary 130.

The protected region 110 includes a wireless communication system 111, itself including a set of wireless devices normally exchanging a set of message packets 113.

Some examples of possible wireless communication systems 111 include, without limitation:

a retail wireless communication system including a stocking database and a set of (fixed or mobile) point-of-sale terminals wirelessly coupled thereto, possibly using wireless access points as intermediaries;

an office wireless communication system including a control element, a set of access points, and a set of user stations (fixed or mobile) wirelessly coupled to those access points;

a secure test center in which communication (wireless or otherwise) with outside devices is generally prohibited;

an environment generally open for use by mobile user stations, including possibly laptop computers and cellular telephones.

In one embodiment, the wireless communication systems 111 includes a control element 114, access points 115, and user stations 116, as control elements, access points, and user stations (also called "mobile stations") are described in U.S. Application Ser. No. 11/715,287, filed Mar. 7, 2007 in the name of inventors Bharghavan, Han, Epstein, Dunsbergen, and Balasubramanian, titled "Seamless Mobility in Wireless Networks", hereby incorporated by reference as if fully set forth herein.

The non-protected region 120 might include external devices 121, such as possibly hostile devices 122, friendly devices 123, or other devices 124.

Some examples of possible hostile devices 122 include, without limitation:

a data sniffer, intended to receive message packets, decode them, and obtain information not generally intended for the public;

an external supplier of test answers or other information to a person in a secure test center.

Some examples of possible friendly devices 123 include, without limitation:

one or more external point-of-sale devices located outside a secure region of a retail wireless communication system, e.g., at a parking-lot tent for sale of goods or services on special sale, or, e.g., a mobile sales terminal such as might be used at a rental-car return location;

Some examples of possible other devices 124 include, without limitation:
one or more cellular telephones;
one or more mobile computing devices, e.g., laptop computers.

The boundary 130 includes one or more boundary points 131, each disposed at a point substantially between the protected region 110 and the non-protected region 120. In one embodiment, each boundary point 131 is situated at a substantially fixed location; however, in the context of the invention, this is no particular requirement. In alternative embodiments, boundary points 131 may be disposed in a substantially mobile manner, with the effect that the collection of boundary points 131 forms a substantial boundary between the protected region 110 and the non-protected region 120 (or at the least, between those portions thereof which are deemed sufficiently important).

In one embodiment, each boundary point 131 includes an in-facing antenna 132, an out-facing antenna 133, a packet decoder 134, and a traffic blocker 135.

Outgoing Traffic

The in-facing antenna 132 is disposed to detect message packets 113 arriving from within the protected region 110, with the effect that any message packet 113 emitted within the protected region 110 will be detected (with sufficiently strong signal-to-noise ratio) at one or more boundary points 131.

The packet decoder 134 is coupled to the in-facing antenna 132, with the effect that any message packet 113 detected by the in-facing antenna 132 can be interpreted by the packet decoder 134. The packet decoder 134 is further disposed to detect a header portion of each such message packet 113, with the effect that the packet decoder 134 can determine the source MAC address, destination MAC address, protocol type, port number, and other relevant information about the message packet 113.

The traffic blocker 135 is coupled to the packet decoder 134, and is capable of receiving the information relevant to the message packet 113 found by the packet decoder 134. The traffic blocker 135 consults a set of source information 136 to determine whether the particular message packet 113 should be blocked from transmission outside the protected region 110.

Some examples of source information 136 usable by the traffic blocker 135 include, without limitation:

A set of source or destination MAC addresses for devices for which wireless communication should be explicitly allowed or denied. In one embodiment, these source or destination MAC addresses might be disposed in a list with designated fixed bits and designated "don't care" bits, similar to an ACL in a network routing system. Thus, e.g., the source information 136 might be set to allow a source MAC address of 31.41.59.26, followed by denying any source MAC address matching *.*.*.* (i.e., any other source MAC address), thus providing that only source MAC address 31.41.59.26 can transmit message packets 113 from the protected region 110 to the non-protected region 120.

Similarly, a set of protocol value or port values for which wireless communication should be explicitly allowed or denied. Thus, e.g., the source information 136 might be set to explicitly allow FTP traffic but to explicitly deny IM traffic.

A set of physical locations, or regions thereof, for the source or destination device, so far as the boundary point 131 can determine. Thus, e.g., the source information 136 might be set to explicitly allow message packets 113 from source devices within the protected region 110 to destination devices within a second protected region 110, and to explicitly deny all other wireless communication.

The source information 136 might be combined with a set of calendar information, e.g., time of day, day of week, day of year, and similar information regarding timing, with the effect that the decisions above might be made conditional on one or more particular schedules. A system with this capability is described in other and further detail in U.S. application Ser. No. 12/023,911, filed Jan. 31, 2008, in the name of inventor Rajinder Singh, titled "SSID Calendars", hereby incorporated by reference as if fully set forth herein.

The out-facing antenna 133 is coupled to the traffic blocker 135, and operates to cause the message packet 113 to be blocked if the traffic blocker 135 determines the message packet 113 should be blocked. When the traffic blocker 135 determines that the message packet 113 should be blocked, the out-facing antenna 133 operates to output a signal which disrupts the remainder of the message packet 113, i.e., that portion of the message packet 113 other than the header portion. The outfacing antenna 133 might output a signal which is pure random (or pseudorandom) noise, at a sufficient signal strength that any receiving device outside the protected region 110 will be unable to reliably determine any of the bits of the message packet 113 other than the header portion. In one embodiment, such receiving devices would also be unable to reliably determine any of the bits of the header portion of the message packet 113, as a checksum for the message packet 113 would be sufficiently disrupted for the receiver to determine if it had received the header portion correctly or not.

Incoming Traffic

In alternative embodiments, the boundary 130 might be disposed to receive traffic incoming to the protected region 110 (either in addition to, or in lieu of, traffic outgoing from the protected region 110). One such embodiment may include when the protected region 110 includes a secure test center and it is desired to prevent any information from being received by test-takers in that protected region 110. In such alternative embodiments, the boundary points 131 operate to detect message packets 113 originating from the non-protected region 120 and to disrupt disallowed message packets 113 from being received within the protected region 110.

Figure 2:
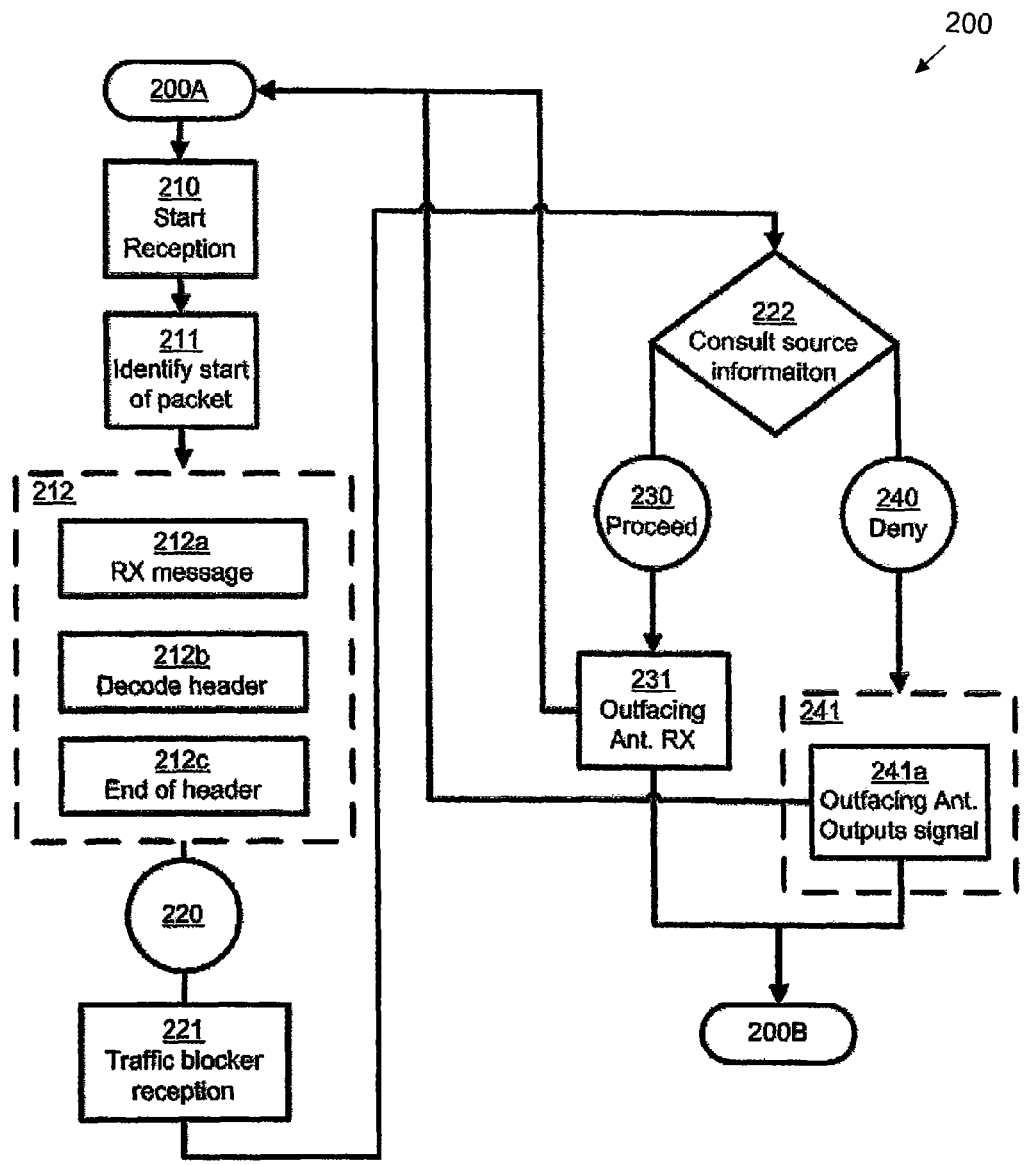
FIG. 2 is a flow diagram illustrating a method for providing a selective barrier for wireless communication.

FIG. 2 shows a process flow diagram.

A method 200 includes a set of flow labels and steps as shown in the FIG. 2, including at least a flow label 200A indicating a beginning of the method, a flow label 210 indicating a start of reception, a flow label 220 indicating recognition of a message packet 113, a flow label 230 indicating a decision to allow wireless communication, a flow label 240 indicating a decision to deny wireless communication, a flow label 200B indicating an end of the method, and steps associated therewith.

Beginning of Method

Reaching a flow label 200A indicates a beginning of the method 200.

Start of Reception

Reaching a flow label 210 indicates the method 200 is starting reception of a message packet 113.

At a step 211, the in-facing antenna 132 of at least one boundary point 131 in the boundary 130 identifies the start of a message packet 113. In one embodiment, the start of a message packet 113 can be recognized by a particular pattern of signal bits or other signal phenomena.

At a step 212, the packet decoder 134 decodes the header portion of the message packet 113. To perform this step, the method 200 performs the following substeps:

At a sub-step 212a, the packet decoder 134 receives the start of the message packet 113.

At a sub-step 212b, the packet decoder 134 decodes the header portion of the message packet 113. As part of this sub-step, the packet decoder 134 determines the source MAC address, destination MAC address, protocol type, port number, and other relevant information about the message packet 113.

At a sub-step 212c, the packet decoder 134 reaches the end of the header portion of the message packet 113.

Recognition of Message Packet

Reaching a flow label 220 indicates the method 200 recognizes a message packet 113.

At a step 221, the traffic blocker 135 receives the information relevant to the message packet 113 found by the packet decoder 134.

At a step 222, the traffic blocker 135 consults the set of source information 136 to determine whether the particular message packet 113 should be blocked from transmission outside the protected region 110.

If the traffic blocker 135 determines that the message packet 113 should not be blocked, i.e., allowed to continue from the protected region 110 to outside the protected region 110 (e.g., the message packet 113 is deemed harmless, or the message packet 113 is destined for a second protected region 110), the method 200 proceeds with the flow point 230 ("DECISION TO ALLOW COMMUNICATION").

If the traffic blocker 135 determines that the message packet 113 should be blocked, i.e., disallowed to continue from the non-protected region 110 to outside the non-protected region 110, the method 200 proceeds with the flow point 240 ("DECISION TO DENY COMMUNICATION").

Decision to Allow Communication

Reaching a flow label 230 indicates the method 200 decides to allow wireless communication of the message packet 113.

The method 200 does not need to perform any action to allow the message packet 113 to proceed.

At a step 231, the out-facing antenna 133 receives the decision from the traffic blocker 135, and in response thereto, takes no action.

The method 200 proceeds with the flow point 200A.

Decision to Deny Communication

Reaching a flow label 240 indicates the method 200 decides to deny wireless communication of the message packet 113.

At a step 241, the out-facing antenna 133 receives the decision from the traffic blocker 135, and in response thereto, operates to cause the message packet 113 to be blocked. To perform this step, the out-facing antenna 133 performs the following sub-steps:

At a sub-step 241a, the out-facing antenna 133 operates to output a signal which disrupts the remainder of the message packet 113, i.e., that portion of the message packet 113 other than the header portion. As noted above, the outfacing antenna 133 might output a signal which is an IEEE 802.11 management frame or an IEEE 802.11 data packet, at a sufficient signal strength that any receiving device outside the protected region 110 will be unable to reliably determine any of the bits of the message packet 113 other than the header portion.

The method 200 proceeds with the flow point 200A.

End of Method

Reaching a flow label 200B indicates an end of the method 200.

In practice, the flow label 200B is never reached, as the method 200 returns to the flow label 200A to be repeated continually.

ALTERNATIVE EMBODIMENTS

After reading this application, those skilled in the art would recognize that the scope and spirit of the invention includes other and further embodiments beyond the specifics of those disclosed herein, and that such other and further embodiments would not require new invention or undue experimentation.

What is claimed is:

1. A computer-implemented method for blocking selected messages in a wireless network based on crossing a boundary, comprising:
   connecting to the wireless network which protects a first region defined by at least one boundary point and distinct from a second region defined by at least one boundary point;
   determining physical locations for stations within the first and second regions;
   intercepting a message from a first region with a first antenna pointing inward from a boundary, the message comprising a first portion and a second portion;
   recognizing from the first portion of the message that the message is unauthorized communication with a device in an unprotected region, the message being sourced from a station physically located within the first and second regions;
   disrupting reception of the message using a second antenna pointing outward from the boundary;
   subsequently determining physical locations for stations within the first and second regions; and
   based on the subsequent determination, dynamically changing the boundary.

2. The method of claim 1, wherein disrupting reception comprises:
   disrupting reception of the second portion of the message using the second antenna pointing outward from the boundary by transmitting random noise.

3. The method of claim 1, wherein disrupting reception comprises:
   disrupting reception of the second portion of the message using the second antenna pointing outward from the boundary by transmitting an IEEE 802.11-management frame.

4. The method of claim 1, wherein disrupting reception comprises:
   disrupting reception of the second portion of the message using the second antenna pointing outward from the boundary by distorting a checksum value associated with the message.

5. The method of claim 1, further comprising:
   defining the boundary collectively with a plurality of blocking devices, each blocking device comprising a first antenna pointing inward from the boundary and a second antenna pointing outward from the boundary, and each blocking device covering a portion of the boundary.

6. The method of claim 5, further comprising:
dynamically changing the boundary,
wherein at least one of the plurality of blocking devices comprise a mobile wireless device that dynamically change at least a portion of the boundary.

7. The method of claim 1, wherein recognizing that the message is unauthorized, comprises:
recognizing that the message is formatted according to a protocol that is unauthorized.

8. At least one non-transitory computer readable medium comprising a computer program product that, when executed by one or more processors, performs a method, the method comprising:
connecting to the wireless network which protects a first region defined by at least one boundary point and distinct from a second region defined by at least one boundary point;
determining physical locations for stations within the first and second regions;
intercepting a message from a first region with a first antenna pointing inward from a boundary, the message comprising a first portion and a second portion;
recognizing from the first portion of the message that the message is unauthorized communication with a device in an unprotected region, the message being sourced from a station physically located within the first and second regions;
subsequently determining physical locations for stations within the first and second regions; and
based on the subsequent determination, dynamically changing the boundary.

9. The computer program product of claim 8, wherein disrupting reception comprises:
disrupting reception of the second portion of the message using the second antenna pointing outward from the boundary by transmitting random noise.

10. The computer program product of claim 8, wherein disrupting reception comprises:
disrupting reception of the second portion of the message using the second antenna pointing outward from the boundary by transmitting an IEEE 802.11 management frame.

11. The computer program product of claim 8 wherein disrupting reception comprises:
disrupting reception of the second portion of the message using the second antenna pointing outward from the boundary by distorting a checksum value associated with the message.

12. The computer program product of claim 8, further comprising:
defining the boundary collectively with a plurality of blocking devices, each blocking device comprising a first antenna pointing inward from the boundary and a second antenna pointing outward from the boundary, and each blocking device covering a portion of the boundary.

13. The computer program product of claim 12, further comprising:
dynamically changing the boundary,
wherein at least one of the plurality of blocking devices comprise a mobile wireless devices that dynamically change at least a portion of the boundary.

14. The computer program product of claim 8, wherein recognizing that the message is unauthorized, comprises:
recognizing that the message is formatted according to a protocol that is unauthorized.

* * * * *